(12) United States Patent
Syed et al.

(10) Patent No.: US 8,565,545 B1
(45) Date of Patent: Oct. 22, 2013

(54) SYSTEMS AND METHODS FOR RESTORING IMAGES

(75) Inventors: Mehtab Ali Syed, Maharashtra (IN); Mohammed Shaikh, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 320 days.

(21) Appl. No.: 13/081,655

(22) Filed: Apr. 7, 2011

(51) Int. Cl.
*G06K 9/40* (2006.01)

(52) U.S. Cl.
USPC .......................................................... 382/254

(58) Field of Classification Search
USPC ............... 382/254; 707/812, 821–831; 711/4, 711/100, 111, 113, 114, 161, 162
See application file for complete search history.

(56) References Cited

U.S. PATENT DOCUMENTS

| 5,907,672 | A  | * | 5/1999 | Matze et al. | 714/6.13 |
| 7,831,550 | B1 | * | 11/2010 | Pande et al. | 707/610 |
| 2010/0265959 | A1 | * | 10/2010 | Lin | 370/401 |
| 2011/0185190 | A1 | * | 7/2011 | Berengoltz et al. | 713/189 |
| 2012/0265959 | A1 | * | 10/2012 | Le et al. | 711/162 |

* cited by examiner

*Primary Examiner* — Gregory F Cunningham
(74) *Attorney, Agent, or Firm* — ALG Intellectual Property, LLC

(57) ABSTRACT

A computer-implemented method for restoring images may include (1) identifying an image to restore to a volume, (2) creating a synchronization map that reflects differences between the image and the volume, (3) intercepting at least one attempt to read from a region of the volume, (4) determining, based on the synchronization map, that the region has not yet been restored from the image, (5) copying the region from the image to the volume, (6) updating the synchronization map to reflect that the region has been restored, and (7) allowing the attempt to read from the region to proceed. Various other methods, systems, and computer-readable media are also disclosed.

20 Claims, 7 Drawing Sheets

SYSTEMS AND METHODS FOR RESTORING IMAGES

BACKGROUND

Restoring data from backup is often a time-sensitive operation. As such, an organization may wish to minimize the downtime of applications that rely on stored data following a storage-system failure and/or other data-loss event.

However, some applications may require access to a large volume of data, and restoring a large volume of data using traditional approaches (e.g., by copying the entire volume from a remote location to local storage) may take a substantial amount of time. Unfortunately, this may result in a substantial amount of downtime for these applications. Accordingly, the instant disclosure identifies a need for additional and improved systems and methods for restoring data.

SUMMARY

As will be described in greater detail below, the instant disclosure generally relates to systems and methods for restoring images by maintaining a synchronization map between a volume that is being restored and an image from which the volume is being restored. These systems and methods may service I/O requests directed toward regions within the volume by first retrieving the regions from the image when the synchronization map indicates that the regions have not yet been restored to the volume. In some examples, the synchronization may persist across computing sessions (e.g., by flushing the synchronization map to a persistent storage device after each transaction). In some examples, the systems described herein may accomplish such a task by (1) identifying an image to restore to a volume, (2) creating a synchronization map that reflects differences between the image and the volume, (3) intercepting at least one attempt to read from a region of the volume, (4) determining, based on the synchronization map, that the region has not yet been restored from the image, (5) copying the region from the image to the volume, (6) updating the synchronization map to reflect that the region has been restored, and (7) allowing the attempt to read from the region to proceed.

The systems described herein may identify the image in a variety of contexts. In one example, these systems may identify a remotely-stored image. In some examples, these systems may mount the image.

The synchronization map may include any of a variety of information that may reflect the differences between the image and the volume. In one example, the synchronization map may include a bitmap indicating which regions within the image have yet to be restored to the volume. In some examples, updating the synchronization map may include updating the synchronization map on a non-volatile storage device.

The systems described herein may intercept the attempt to read from the region in any of a variety of contexts. In one example, these systems may intercept the attempt from within a filter driver.

In some examples, the systems and methods described herein may also: (1) identify at least one additional attempt to read from an additional region of the volume, (2) determine, based on the synchronization map, that the region has been restored from the image, and (3) allow the attempt to read from the additional region to proceed.

As will be explained in greater detail below, by exposing the volume before the restoration is complete and retrieving missing regions from the image on an as-needed basis (e.g., when the synchronization map indicates that a region to which an I/O attempt applies has not yet been restored), the systems and methods described herein may efficiently restore the image to the volume without causing a lengthy downtime for applications which depend on the volume. Furthermore, according to some examples, by implementing at least some of the modules and method steps described herein within a filter driver, these systems and methods may perform this efficient restoration without requiring changes to existing file systems or volume managers (e.g., these systems and methods may be compatible with existing file systems and volume managers). Additionally, according to some examples, by maintaining a persistent synchronization map, these systems and methods may function across computing sessions. Furthermore, according to some examples, these systems and methods may perform this efficient restoration from a remote storage device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
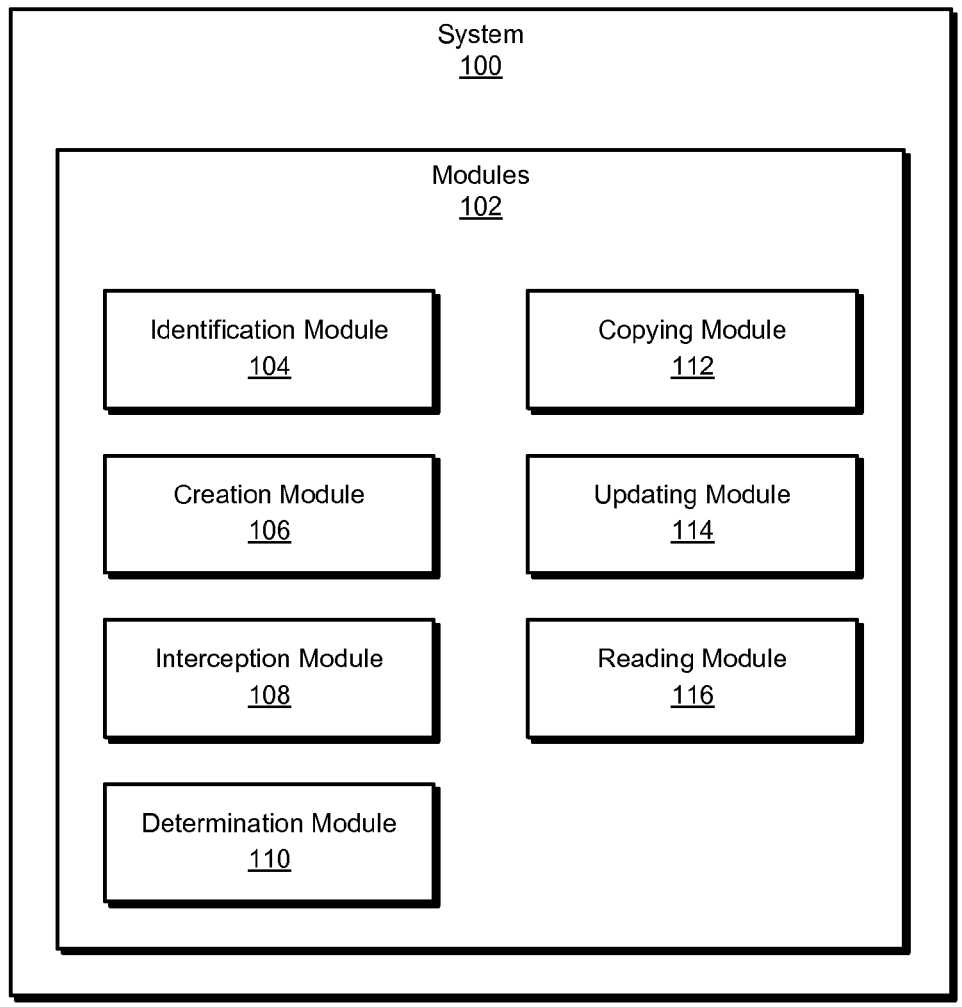
FIG. 1 is a block diagram of an exemplary system for restoring images.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
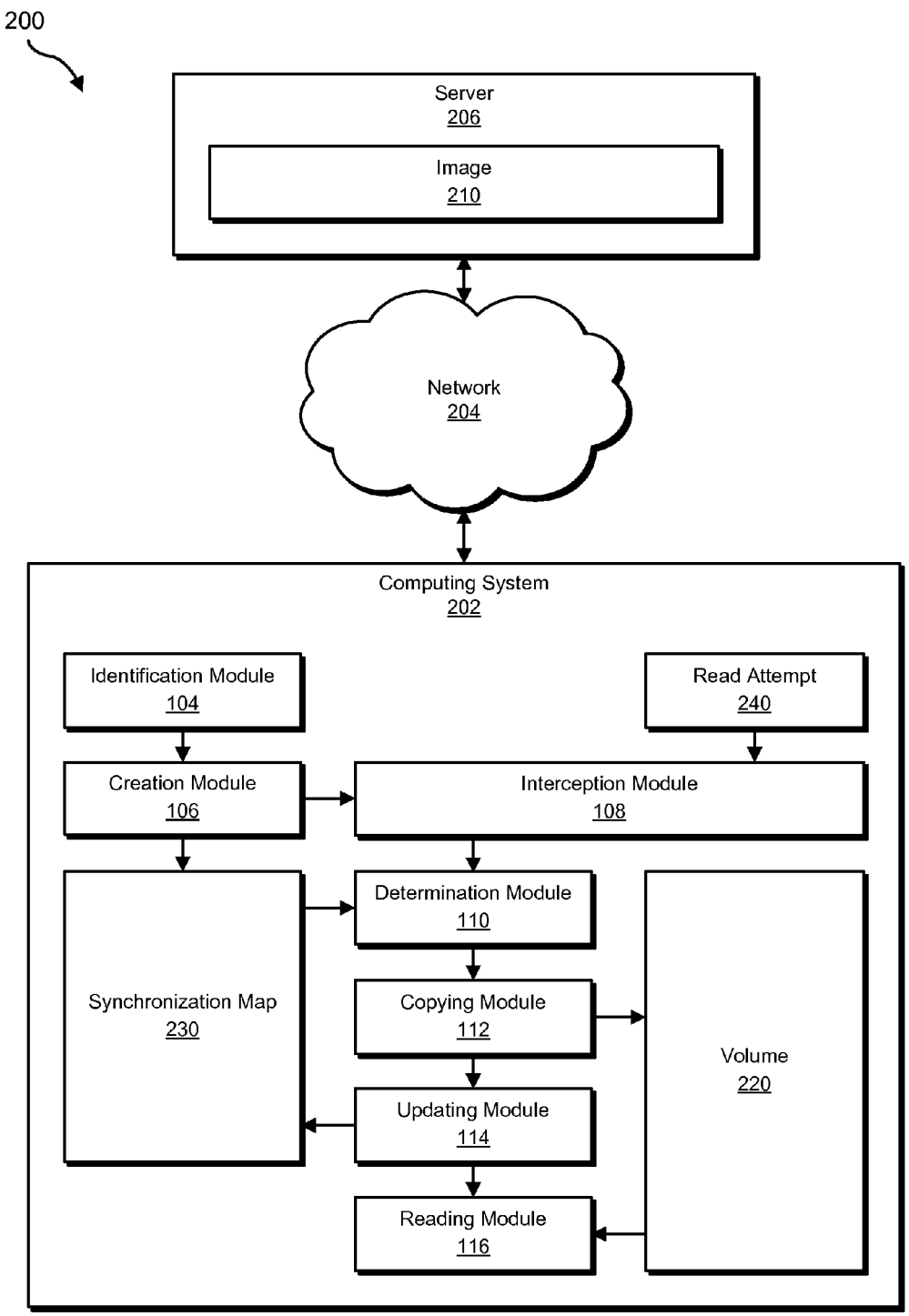
FIG. 2 is a block diagram of an exemplary system for restoring images.
Figure 3:
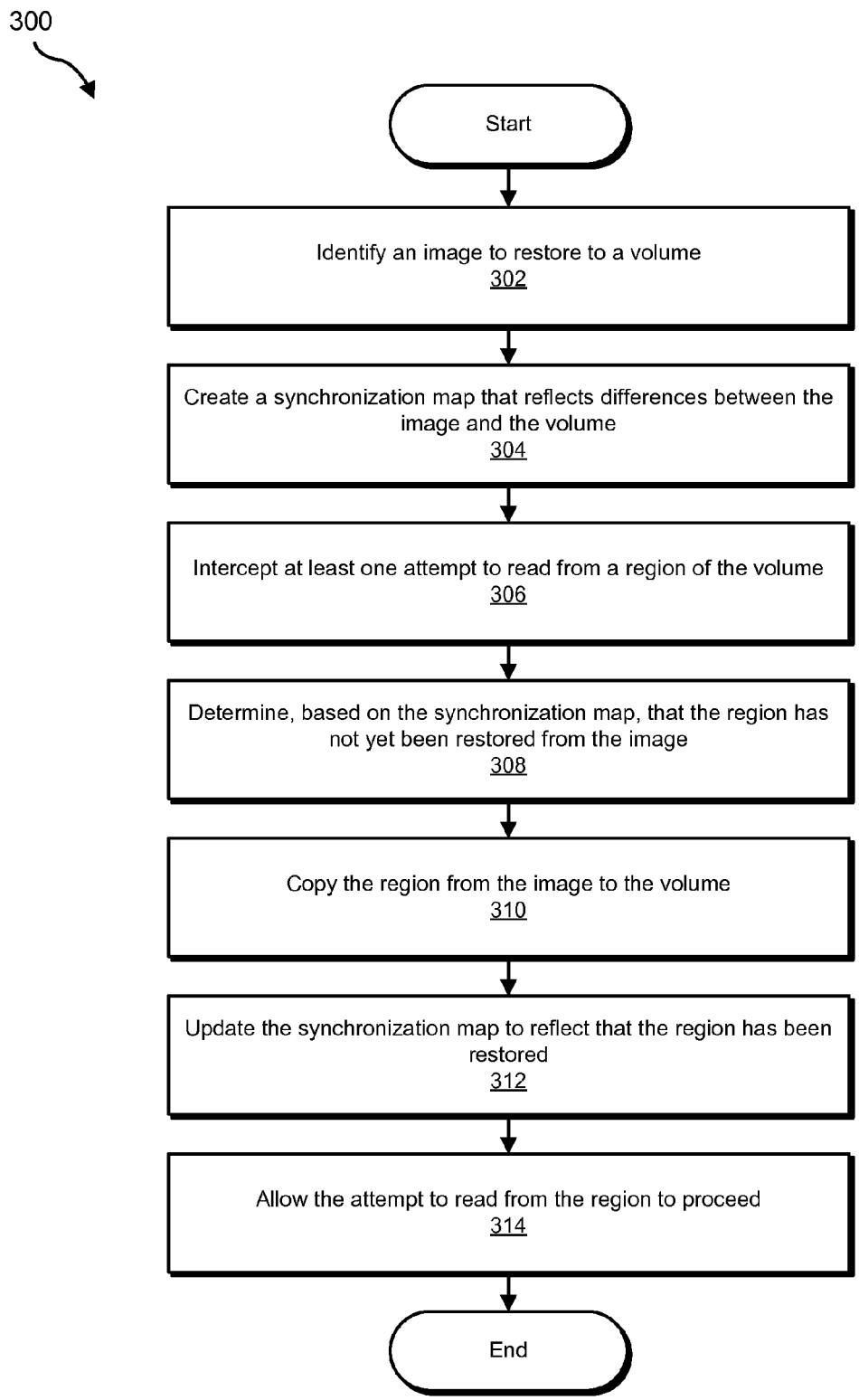
FIG. 3 is a flow diagram of an exemplary method for restoring images.
Figure 4:
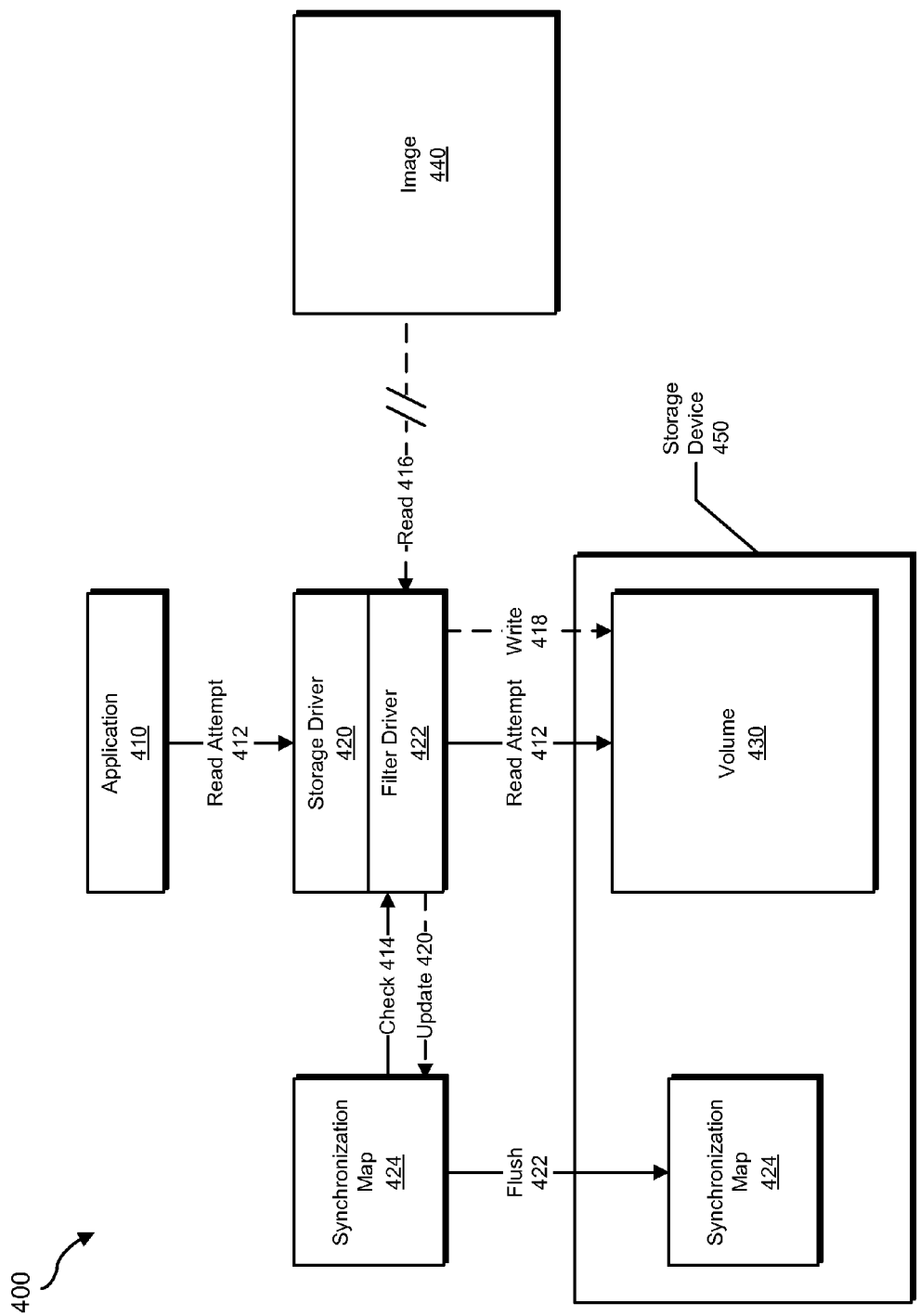
FIG. 4 is a block diagram of an exemplary system for restoring images.

The following will provide, with reference to FIGS. 1, 2, and 4, detailed descriptions of exemplary systems for restoring images. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for restoring images. As illustrated in this figure, exemplary system 100 may include one or more modules 102 for performing one or more tasks. For example, and as will be explained in greater detail below, exemplary system 100 may include an identification module 104 programmed to identify an image to restore to a volume. Exemplary system 100 may also include a creation module 106 programmed to create a synchronization map that reflects the differences between the image and the volume. Exemplary system 100 may additionally include an interception module 108 programmed to intercept at least one attempt to read from a region of the volume.

In addition, and as will be described in greater detail below, exemplary system 100 may include a determination module 110 programmed to determine, based on the synchronization map, that the region has not yet been restored from the image. Exemplary system 100 may further include a copying module 112 programmed to copy the region from the image to the volume. Exemplary system 100 may also include an updating module 114 programmed to update the synchronization map to reflect that the region has been restored. Exemplary system 100 may additionally include a reading module 116 programmed to allow the attempt to read from the region to proceed. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 in communication with a server 206 via a network 204. Server 206 may include an image 210 to be restored to a volume 220 within computing system 202. In one embodiment, and as will be described in greater detail below, modules 102 from FIG. 1 may program computing system 202 to restore image 210 to volume 220 by (1) identifying an image to restore to a volume (e.g., identifying image 210 to restore to volume 220), (2) creating a synchronization map that reflects differences between the image and the volume (e.g., creating a synchronization map 230), (3) intercepting at least one attempt to read from a region of the volume (e.g., intercepting a read attempt 240 directed to volume 220), (4) determining, based on the synchronization map, that the region has not yet been restored from the image (e.g., that the target region of read attempt 240 has not yet been restored to volume 220 from image 210), (5) copying the region from the image to the volume, (6) updating the synchronization map to reflect that the region has been restored, and (7) allowing the attempt to read from the region to proceed (e.g., allowing read attempt 240 to proceed to volume 220).

Computing system 202 generally represents any type or form of computing device capable of reading computer-executable instructions. Examples of computing system 202 include, without limitation, desktops, servers, laptops, cellular phones, personal digital assistants (PDAs), multimedia players, embedded systems, combinations of one or more of the same, exemplary computing system 610 in FIG. 6, or any other suitable computing device.

Server 206 generally represents any type or form of computing device that is capable of storing an image. Examples of server 206 include, without limitation, backup servers, application servers, and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing system 202 and server 206.

FIG. 3 is a flow diagram of an exemplary computer-implemented method 300 for restoring images. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify an image to restore to a volume. For example, at step 302 identification module 104 may, as part of computing system 202 in FIG. 2, identify image 210.

As used herein, the term "volume" may refer to any distinctly identifiable collection of data. In some examples, the volume may correspond to a logical interface used by a file system to access data. Accordingly, as will be described in greater detail below, in some examples identification module 104 may dismount the volume until a filter driver configured to perform one or more of the steps described herein has been loaded.

As used herein, the term "image" may refer to any collection of data for protecting and/or preserving a collection of primary data. In some examples, the image may include a backup image. For example, the image may include a V2I file. Additionally or alternatively, the image may include a virtual image. For example, the image may include a VHD file and/or a VMDK file. Accordingly, the systems and methods herein may be useful for restoring volumes from backup images and/or for loading and/or instantiating volumes from virtual storage data structures.

In some examples, identification module 104 may mount the image (e.g., within the file system used to access the volume). For example, identification module 104 may be configured to mount images of any of a variety of formats from any of a variety of media using a specified framework. Accordingly, in some examples, the image may include a remotely-stored image, which identification module 104 may identify and mount. In various examples, the remotely-stored image may include a deduplicated image, an image stored within cloud storage, etc.

Identification module 104 may identify the image in any of a variety of contexts. For example, identification module 104 may identify the image by receiving and/or intercepting a message indicating that the image will be restored to the volume and/or is in the process of being restored to the volume.

FIG. 4 illustrates an exemplary system 400 for restoring images. Using FIG. 4 as an example, identification module may identify an image 440 to restore to a volume 430.

Returning to FIG. 3, at step 304 one or more of the systems described herein may create a synchronization map that reflects differences between the image and the volume. For example, at step 304 creation module 106 may, as part of computing system 202 in FIG. 2, create synchronization map 230. Using FIG. 4 as an example, at step 304 creation module 106 may create synchronization map 424.

As used herein, the phrase "synchronization map" may refer to any data structure capable of representing differences between the image and the volume. For example, the synchronization map may include a bitmap indicating which regions within the image have yet to be restored to the volume (e.g., with a "dirty" bit indicating that a region has not yet been restored and a "clean" bit indicating that a region has been restored). In some examples, as will be explained in greater detail below, the synchronization map may persist across computing sessions.

In some examples, creation module 106 may initialize the synchronization map with a bitmap of the image. Additionally or alternatively, creation module 106 may initialize and/or maintain the synchronization map to reflect regions of the image which have already been restored to the volume. For example, creation module 106 may communicate with, intercept messages from, and/or operate as a part of a restoration application configured to restore the image to the volume.

As used herein, the term "region" may refer to any unit of storage. For example, the term "region" may refer to a block and/or a sector of data. In some examples, the term "region" may refer to a unit of data used by the format of the image.

Returning to FIG. 3, at step 306 one or more of the systems described herein may intercept at least one attempt to read from a region of the volume. For example, at step 306 interception module 108 may, as part of computing system 202 in FIG. 2, intercept read attempt 240. Using FIG. 4 as an example, at step 306 interception module 108 may intercept a read attempt 412 from an application 410 (e.g., within a filter driver 422 operating in concert with a storage driver 420).

As used herein, the phrase "filter driver" may refer to any driver configured to add functionality for a device and/or system without replacing a primary driver for the device and/or system.

Interception module 108 may operate within any of a variety of contexts. For example, as mentioned earlier, interception module 108 may operate as part of a filter driver. Accordingly, interception module 108 may intercept the attempt from within the filter driver. Additionally or alternatively, interception module 108 may inject a filter driver configured to intercept I/O attempts into a driver stack of the storage system. Interception module 108 may inject the filter driver at any suitable time, such as at the commencement of the restoration process. As mentioned earlier, in some examples, one or more of the systems described herein may mount the image. In these examples, interception module 108 may configure the filter driver with a device name corresponding to the mounted image as well as an identification of the volume.

Returning to FIG. 3, at step 308 one or more of the systems described herein may determine, based on the synchronization map, that the region has not yet been restored from the image. For example, at step 308 determination module 110 may, as part of computing system 202 in FIG. 2, determine, based on synchronization map 230, that the region targeted by read attempt 240 has not yet been restored from image 210 to volume 220. Using FIG. 4 as an example, at step 308 determination module 110 may, as a part of filter driver 422, determine, based on a check 414 of synchronization map 424, that the region targeted by read attempt 412 has not yet been restored from image 440 to volume 430.

Determination module 110 may perform step 308 in any suitable manner. For example, as mentioned earlier, the synchronization map may include a bitmap. In this example, determination module 110 may inspect the bitmap and find that the bit corresponding to the region is marked as "dirty" (e.g., out of sync).

Returning to FIG. 3, at step 310 one or more of the systems described herein may copy the region from the image to the volume. For example, at step 310 copying module 112 may, as part of computing system 202 in FIG. 2, copy the region targeted by read attempt 240 from image 210 to volume 220. Using FIG. 4 as an example, at step 310 copying module 112 may, as a part of filter driver 422, copy the region targeted by read attempt 412 from image 440 to volume 430 by performing a read 416 and a write 418.

Copying module 112 may perform step 310 in any suitable manner. For example, as mentioned earlier, identification module 104 may mount the image. In this example, copying module 112 may read the region from the image by reading from a device corresponding to the mounted image. Copying module 112 may then write the region to the volume.

Returning to FIG. 3, at step 312 one or more of the systems described herein may update the synchronization map to reflect that the region has been restored. For example, at step 312 updating module 114 may, as part of computing system 202 in FIG. 2, update synchronization map 230 to reflect that the region targeted by read attempt 240 has been restored from image 210 to volume 220. Using FIG. 4 as an example, at step 312 updating module 114 may, as a part of filter driver 422, perform an update 420 on synchronization map 424 to reflect that the region targeted by read attempt 412 from image 440 to volume 430 has been restored from image 440 to volume 430.

Updating module 114 may perform step 312 in any suitable manner. For example, as mentioned earlier, the synchronization map may include a bitmap. In this example, updating module 114 may mark a bit within the bitmap corresponding to the region as "clean."

In some examples, updating module 114 may update the synchronization map on a non-volatile storage device. For example, updating module 114 may update the synchronization map and then flush the synchronization map to a non-volatile storage device. Using FIG. 4 as an example, after performing update 420 on synchronization map 424, updating module 114 may perform a flush 422 to a persistent copy of synchronization map 424 on a storage device 450. In this manner, if the computing session is interrupted (e.g., due to a reboot), the systems and methods described herein may continue to restore the image without a loss of progress.

Returning to FIG. 3, at step 314 one or more of the systems described herein may allow the attempt to read from the region to proceed. For example, at step 314 reading module 116 may, as part of computing system 202 in FIG. 2, allow read attempt 240 to proceed to volume 220. Using FIG. 4 as an example, at step 314 reading module 116 may, as a part of filter driver 422, allow read attempt 412 to proceed to volume 430.

Reading module 116 may perform step 314 in any suitable manner. For example, reading module 116 may simply process the read attempt that had previously been pended within the filter driver. After step 314, method 300 may terminate.

Figure 5:
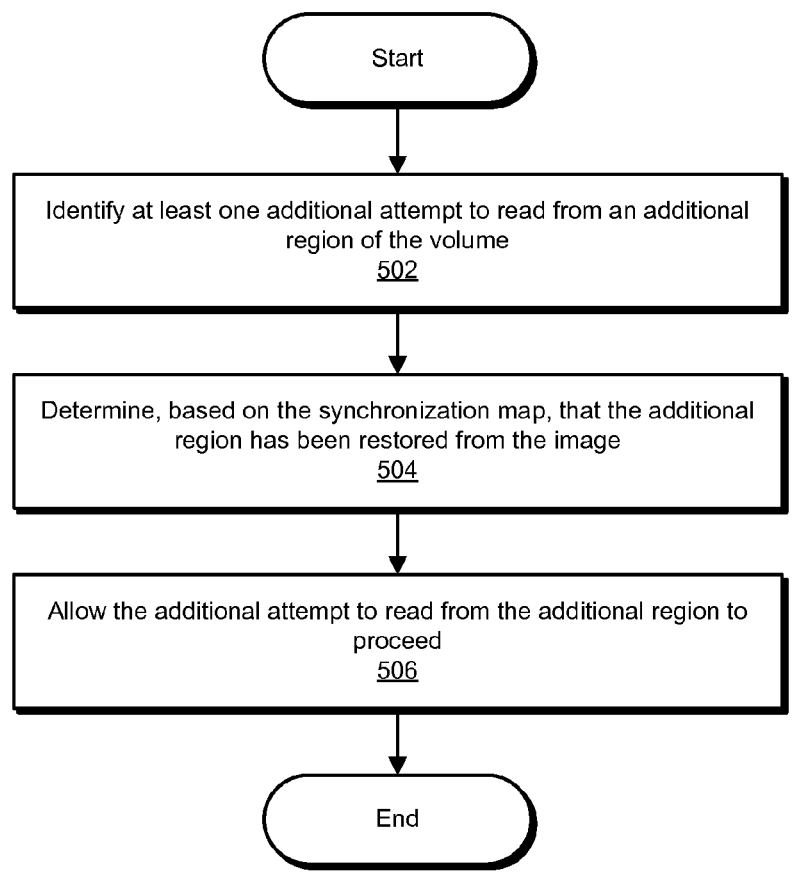
FIG. 5 is a flow diagram of an exemplary method for restoring images.

FIG. 5 is a flow diagram of an exemplary computer-implemented method 500 for restoring images. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2.

As illustrated in FIG. 5, at step 502 one or more of the systems described herein may identify at least one additional attempt to read from an additional region of the volume. For example, at step 502 interception module 108 may, as part of computing system 202 in FIG. 2, identify an additional attempt to read from volume 220. Using FIG. 4 as an additional example, at step 502 interception module 108 may, as part of filter driver 422, identify an additional attempt (e.g., by application 410) to read from volume 430.

At step 504, one or more of the systems described herein may determine, based on the synchronization map, that the additional region has been restored from the image. For example, at step 504 determination module 110 may, as part of computing system 202 in FIG. 2, determine that the additional region has been restored from image 210. Using FIG. 4 as an additional example, at step 504 determination module 110 may, as part of filter driver 422, determine that the additional region has been restored from image 440.

At step 506, one or more of the systems described herein may allow the additional attempt to read from the additional region to proceed (i.e., without first retrieving the additional region from the image). For example, at step 506 reading module 116 may, as part of computing system 202 in FIG. 2, allow the additional attempt to read from the additional region of volume 220 to proceed. Using FIG. 4 as an additional example, at step 506 reading module 116 may, as part of filter driver 422, allow the additional attempt to read from the additional region of volume 430 to proceed.

As explained above, by exposing the volume before the restoration is complete and retrieving missing regions from the image on an as-needed basis (e.g., when the synchronization map indicates that a region to which an I/O attempt applies has not yet been restored), the systems and methods described herein may efficiently restore the image to the volume without causing a lengthy downtime for applications which depend on the volume. Furthermore, according to some examples, by implementing at least some of the modules and method steps described herein within a filter driver, these systems and methods may perform this efficient restoration without requiring changes to existing file systems or volume managers (e.g., these systems and methods may be compatible with existing file systems and volume managers). Additionally, according to some examples, by maintaining a persistent synchronization map, these systems and methods may function across computing sessions. Furthermore, according to some examples, these systems and methods may perform this efficient restoration from a remote storage device.

Figure 6:
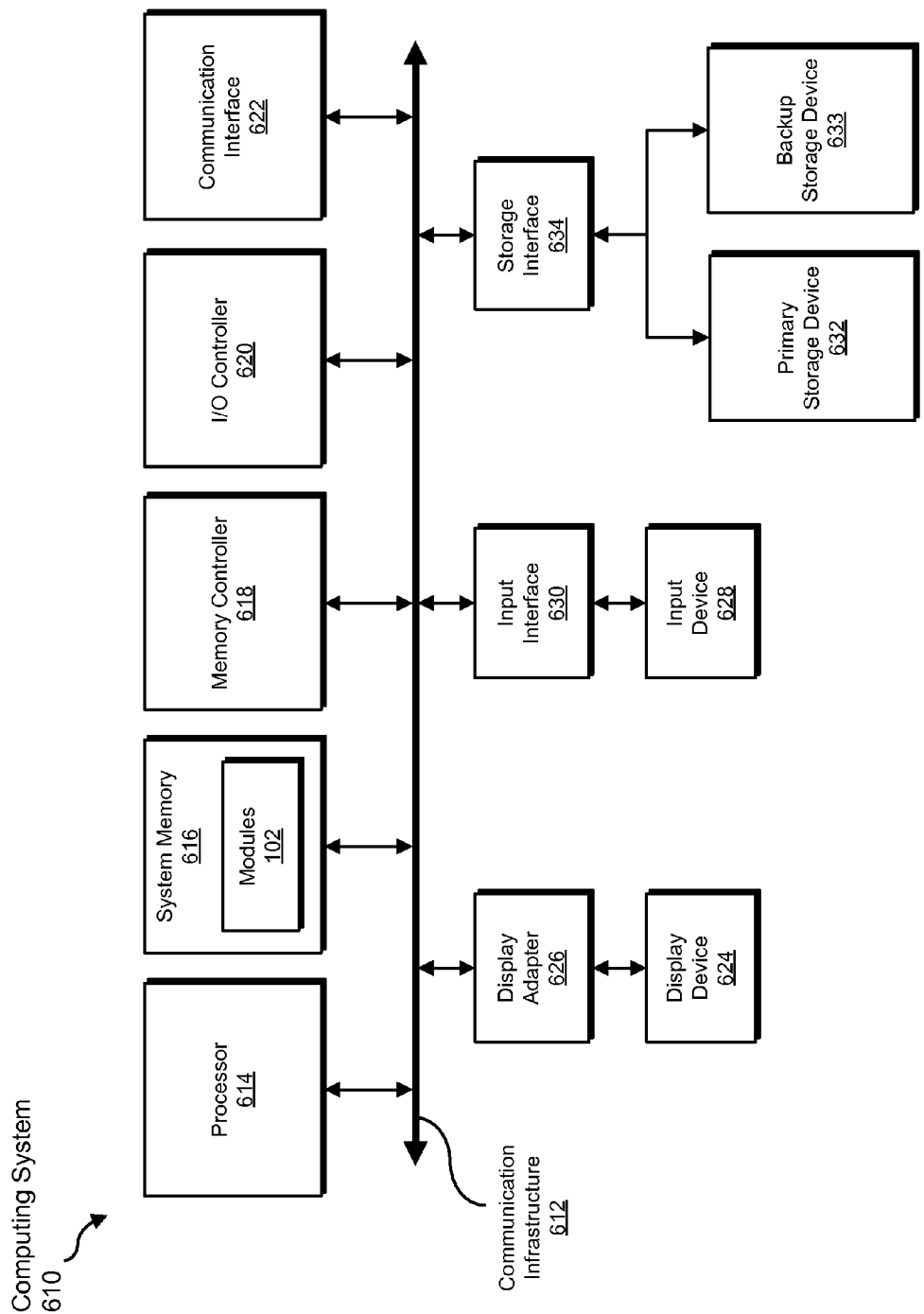
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, mounting, creating, intercepting, determining, copying, updating, and/or allowing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, mounting, creating, intercepting, determining, copying, updating, and/or allowing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, mounting, creating, intercepting, determining, copying, updating, and/or allowing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, mounting, creating, intercepting, determining, copying, updating, and/or allowing steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, mounting, creating, intercepting, determining, copying, updating, and/or allowing steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, mounting, creating, intercepting, determining, copying, updating, and/or allowing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
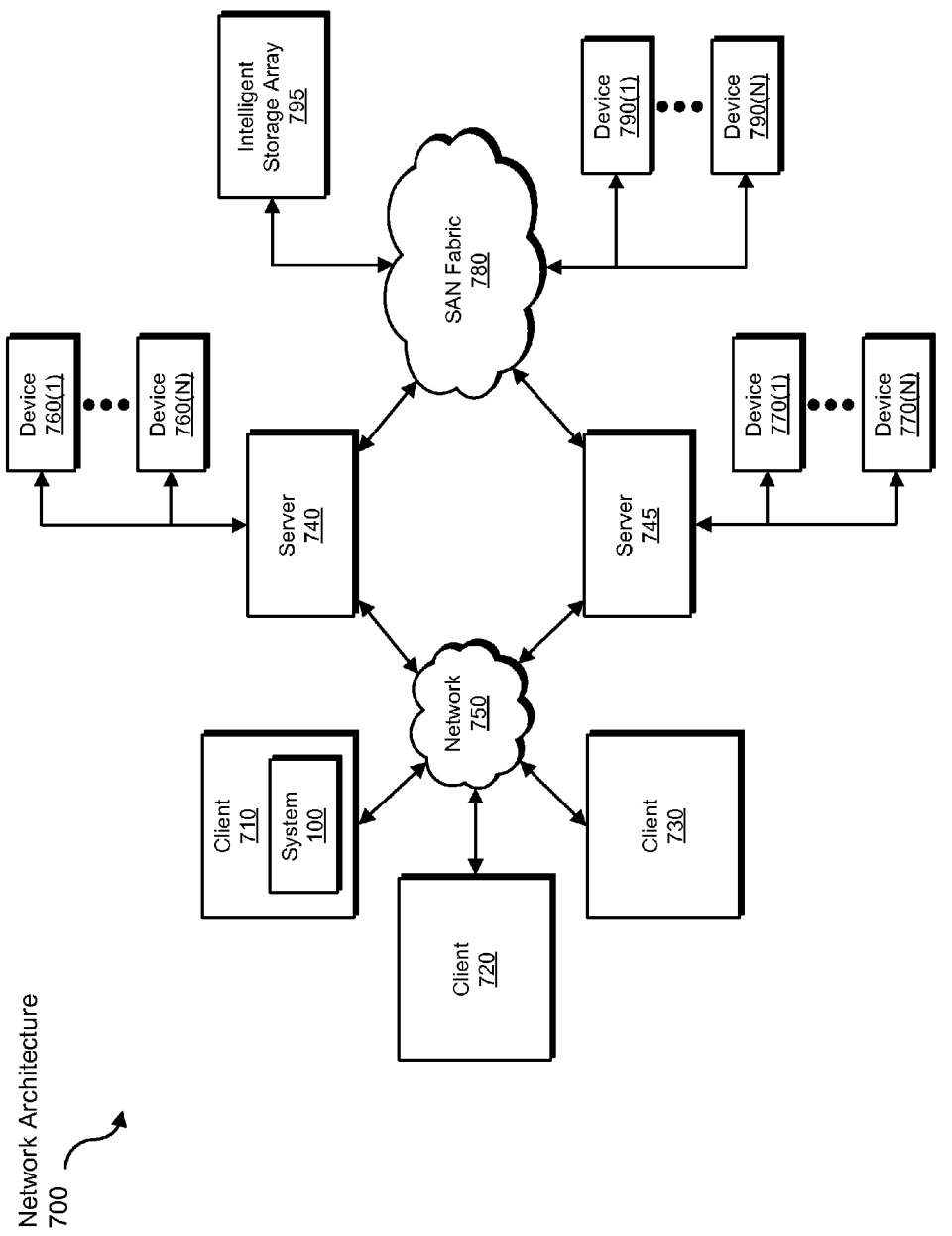
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, mounting, creating, intercepting, determining, copying, updating, and/or allowing steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for restoring images.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a restoring system into a more efficient restoring system. As another example, one or more of the modules described herein may transform an image into a restored volume.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for restoring images, the method being performed by a computing device comprising at least one processor, the method comprising:
   identifying an image to restore to a volume;
   creating a synchronization map that reflects differences between the image and the volume;
   intercepting at least one attempt to read from a region of the volume;
   determining, when the synchronization map indicates that the attempt to read applies to a region that has not yet been restored, that the region of the volume has not yet been restored from the image;
   in response to both the attempt to read from the region of the volume and the determination that the region of the volume has not yet been restored from the image:
     restoring the region of the volume from the image to the volume;
     updating the synchronization map to reflect that the region of the volume has been restored;
     upon restoring the region of the volume from the image to the volume, allowing the attempt to read from the region of the volume to proceed.

2. The computer-implemented method of claim 1, further comprising:
   identifying at least one additional attempt to read from an additional region of the volume;
   determining, based on the synchronization map, that the additional region of the volume has been restored from the image;
   allowing the additional attempt to read from the additional region of the volume to proceed.

3. The computer-implemented method of claim 1, wherein intercepting the attempt to read from the region of the volume comprises intercepting the attempt from within a filter driver.

4. The computer-implemented method of claim 1, wherein updating the synchronization map comprises updating the synchronization map on a non-volatile storage device.

5. The computer-implemented method of claim 1, wherein the synchronization map comprises a bitmap indicating which regions within the image have yet to be restored to the volume.

6. The computer-implemented method of claim 1, wherein the image comprises at least one of:
   a backup image;
   a virtual image.

7. The computer-implemented method of claim 1, wherein identifying the image comprises mounting the image.

8. The computer-implemented method of claim 1, wherein identifying the image comprises identifying a remotely-stored image.

9. A system for restoring images, the system comprising:
   an identification module programmed to identify an image to restore to a volume;
   a creation module programmed to create a synchronization map that reflects differences between the image and the volume;
   an interception module programmed to intercept at least one attempt to read from a region of the volume;
   a determination module programmed to determine, when the synchronization map indicates that the attempt to read applies to a region that has not yet been restored, that the region of the volume has not yet been restored from the image;
   a copying module programmed to restore the region of the volume from the image to the volume in response to both the attempt to read from the region of the volume and the determination that the region of the volume has not yet been restored from the image;
   an updating module programmed update the synchronization map when the region of the volume has been restored;
   a reading module programmed to allow the attempt to read from the region of the volume to proceed following the restoration of the region of the volume from the image to the volume;
   at least one processor configured to execute the identification module, the creation module, the interception module, the determination module, the copying module, the updating module, and the reading module.

10. The system of claim 9, wherein:
    the interception module is further programmed to identify at least one additional attempt to read from an additional region of the volume;
    the determination module is further programmed to determine, based on the synchronization map, that the additional region of the volume has been restored from the image;
    the reading module is further programmed to allow the additional attempt to read from the additional region of the volume to proceed.

11. The system of claim 9, wherein the interception module is programmed to intercept the attempt to read from the region of the volume by intercepting the attempt from within a filter driver.

12. The system of claim 9, wherein the updating module is programmed to update the synchronization map by updating the synchronization map on a non-volatile storage device.

13. The system of claim 9, wherein the synchronization map comprises a bitmap indicating which regions within the image have yet to be restored to the volume.

14. The system of claim 9, wherein the image comprises at least one of:
    a backup image;
    a virtual image.

15. The system of claim 9, wherein the identification module is programmed to identify the image by mounting the image.

16. The system of claim 9, wherein the identification module is programmed to identify the image by identifying a remotely-stored image.

17. A non-transitory computer-readable-storage medium comprising one or more computer-executable instructions that, when executed by at least one processor of a computing device, cause the computing device to:
   identify an image to restore to a volume;
   create a synchronization map that reflects differences between the image and the volume;
   intercept at least one attempt to read from a region of the volume;
   determine, when the synchronization map indicates that the attempt to read applies to a region that has not yet been restored, that the region of the volume has not yet been restored from the image;
   in response to both the attempt to read from the region of the volume and the determination that the region of the volume has not yet been restored from the image:
      restore the region of the volume from the image to the volume;
      update the synchronization map to reflect that the region of the volume has been restored;
      upon the restoration of the region of the volume from the image to the volume, allow the attempt to read from the region of the volume to proceed.

18. The non-transitory computer-readable-storage medium of claim 17, wherein the one or more computer-executable instructions further cause the computing device to:
   identify at least one additional attempt to read from an additional region of the volume;
   determine, based on the synchronization map, that the additional region of the volume has been restored from the image;
   allow the additional attempt to read from the additional region of the volume to proceed.

19. The non-transitory computer-readable-storage medium of claim 17, wherein intercepting the attempt to read from the region of the volume comprises intercepting the attempt from within a filter driver.

20. The non-transitory computer-readable-storage medium of claim 17, wherein updating the synchronization map comprises updating the synchronization map on a non-volatile storage device.

* * * * *